(12) United States Patent
Huke et al.

(10) Patent No.: US 12,169,997 B2
(45) Date of Patent: *Dec. 17, 2024

(54) METHOD OF PLACING WAGERS THROUGH A MOBILE DEVICE THROUGH A TELEVISION WAGERING PLATFORM

(71) Applicant: AdrenalineIP, Washington, DC (US)

(72) Inventors: Casey Alexander Huke, Washington, DC (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,418

(22) Filed: Jul. 10, 2023

(65) Prior Publication Data

US 2023/0351840 A1 Nov. 2, 2023

Related U.S. Application Data

(63) Continuation of application No. 17/072,343, filed on Oct. 16, 2020, now Pat. No. 11,741,776.

(60) Provisional application No. 63/081,570, filed on Sep. 22, 2020.

(51) Int. Cl.
*G07F 17/32* (2006.01)
*H04N 21/2187* (2011.01)
*H04N 21/414* (2011.01)
*H04N 21/478* (2011.01)

(52) U.S. Cl.
CPC ........ *G07F 17/3211* (2013.01); *G07F 17/323* (2013.01); *G07F 17/3288* (2013.01); *H04N 21/2187* (2013.01); *H04N 21/41407* (2013.01); *H04N 21/4781* (2013.01)

(58) Field of Classification Search
CPC .............. G07F 17/3211; G07F 17/323; G07F 17/3288; H04N 21/2187; H04N 21/41407; H04N 21/4781; H04N 21/25866; H04N 21/4126; H04N 21/43637; H04N 21/44227; H04N 21/8133
USPC ........................................................ 463/31
See application file for complete search history.

(56) References Cited

U.S. PATENT DOCUMENTS

| | | | |
|---|---|---|---|
| 2016/0300425 A1* | 10/2016 | Devaraj | G07F 17/3204 |
| 2016/0358406 A1* | 12/2016 | Daly | H04N 21/4312 |
| 2018/0316948 A1* | 11/2018 | Todd | H04N 21/4312 |
| 2019/0020646 A1* | 1/2019 | Magyar | G06F 21/41 |
| 2019/0020846 A1 | 1/2019 | Ellis et al. | |
| 2019/0158787 A1 | 5/2019 | Pino, Jr. et al. | |
| 2019/0318582 A1* | 10/2019 | Barak | G07F 17/3288 |
| 2020/0020203 A1 | 1/2020 | Jordan | |

(Continued)

FOREIGN PATENT DOCUMENTS

WO 2019244151 A1 12/2019

OTHER PUBLICATIONS

Notification of Transmittal of the International Search Report and the Written Opinion of the International Searching Authority issued on Dec. 22, 2021, in connection with corresponding international Application No. PCT/US2021/050629; 19 pgs.

*Primary Examiner* — Pierre E Elisca
(74) *Attorney, Agent, or Firm* — Maier & Maier, PLLC

(57) ABSTRACT

A system for controlling how wagering odds for individual plays inside of a live sporting event are combined with the broadcast of the live sporting event on a display with a mobile device that is paired with a set top box.

11 Claims, 4 Drawing Sheets

Content - High Level Diagram

(56) References Cited

U.S. PATENT DOCUMENTS

2020/0111325 A1  4/2020 Lockton et al.
2020/0245017 A1* 7/2020 Ganschow ......... H04N 21/4312

* cited by examiner

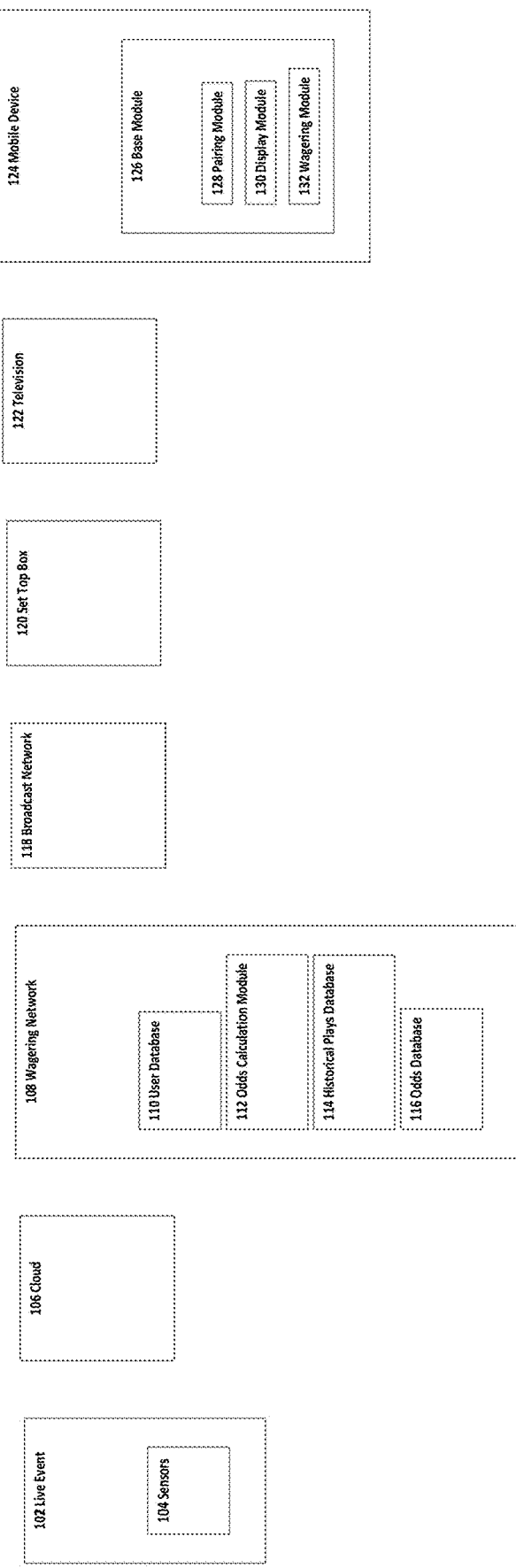
Fig.1 Content - High Level Diagram

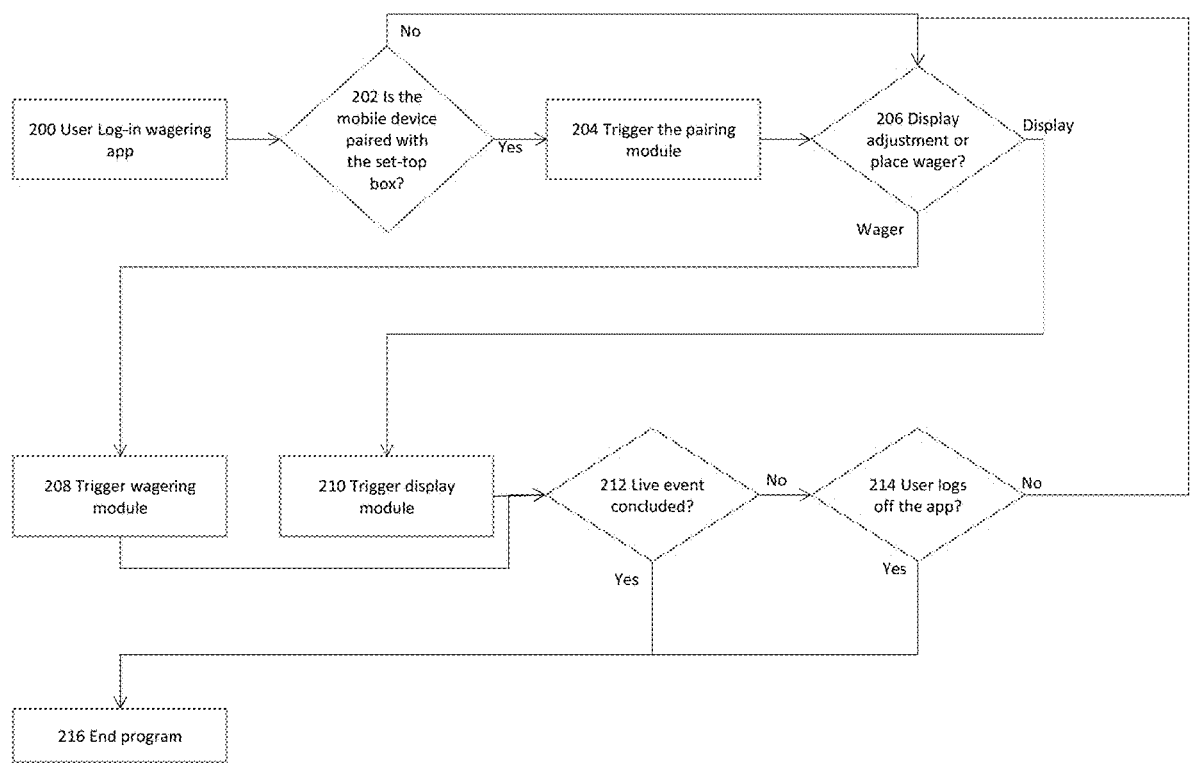
Fig.2 Base Module Object Content

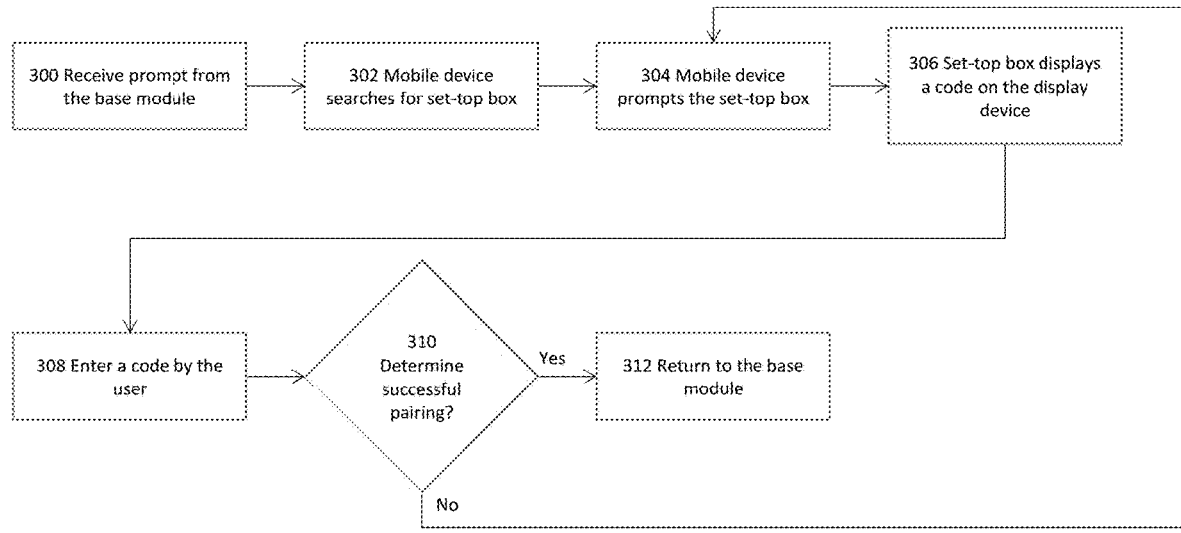
Fig.3 Pairing Module Object Content
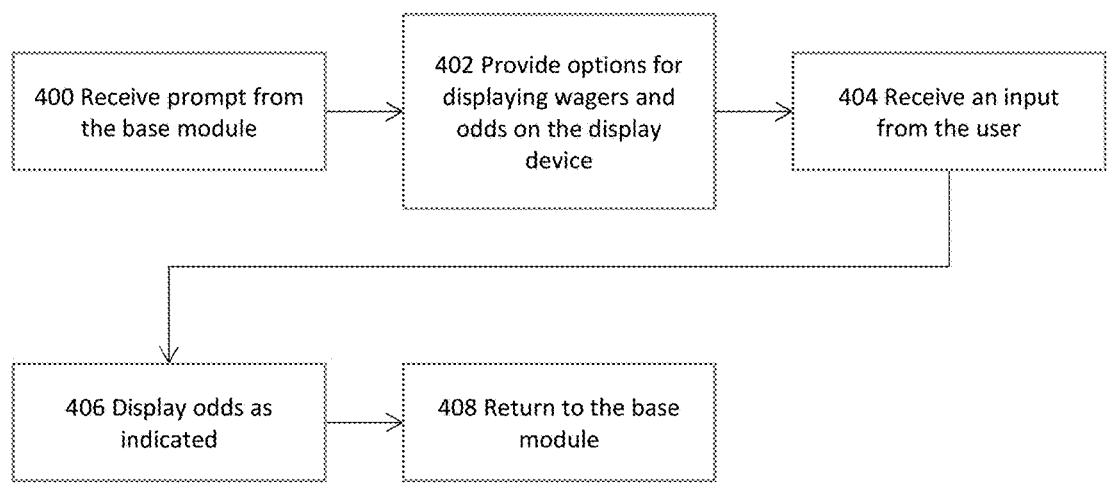
Fig.4 Display Module Object Content

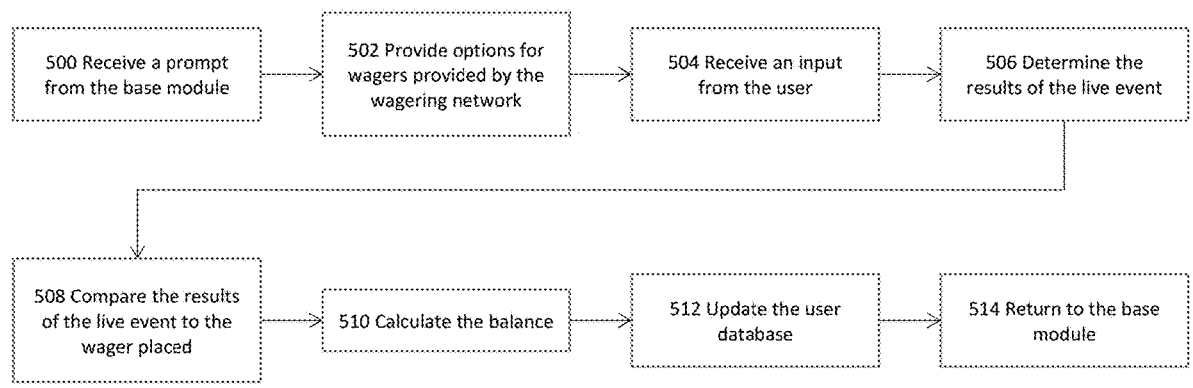
Fig.5 Wagering Module Object Content

METHOD OF PLACING WAGERS THROUGH A MOBILE DEVICE THROUGH A TELEVISION WAGERING PLATFORM

CROSS-REFERENCE TO RELATED APPLICATIONS

The present patent application is a Continuation of U.S. patent application Ser. No. 17/072,343, filed on Oct. 16, 2020, which claims benefit and priority to U.S. Provisional Patent Application No. 63/081,570 entitled "METHOD OF PLACING WAGERS THROUGH A MOBILE DEVICE THROUGH A TELEVISION WAGERING PLATFORM" filed on Sep. 22, 2020, which is hereby incorporated by reference into the present disclosure.

FIELD

The embodiments are generally related to wagering on live sporting events, such as play by play wagering and its interaction with over the top TV equipment.

BACKGROUND

Current broadcasts of live sporting events frequently display additional information to viewers, such as statistics about the game, scores of other games, advertisements, etc. integrated into the display of the live event, often in the form of a ribbon on the bottom or side of the screen or overlaid onto the playing surface. Viewers have no manner with which to change what information is displayed where and when. Often scores and statistics flow across a ribbon like a stock ticker, and viewers need to wait for the information to cycle back around.

Second screen experiences have become a big part of television viewing, often with viewers spending more time engaged with their mobile device than the television.

Third parties, such as fantasy sports platforms, statistics services, news outlets, and sportsbooks are creating more and more content for that second screen experience.

SUMMARY

The embodiments include methods, systems, and apparatuses for placing wagers. One embodiment includes a system integrating play by play sports wagering into the display of a live sporting event, including a mobile device having a first display, a second display, a broadcast of a live sporting event, and a wagering network, where the wagering network provides one or more wagering odds on one or more outcomes for individual plays inside of the live sporting event, and the mobile device controls the integrated display of the wagering odds and the broadcast of the live sporting event on the second display.

Another exemplary embodiment includes a method for displaying wagering information during a live action sporting event, including: displaying a pairing of a mobile device with a first display to a second display; displaying wagering software on the mobile device; displaying, on the mobile device, one or more options related to a type and location of one or more wagering odds on the second display; and displaying, on the mobile device, selections of the one or more wagering odds on the second display based on a selection of the one or more options related to the type and location of the one or more wagering odds.

Another exemplary embodiment can include a method for displaying wagering information during a live action sporting event, including: displaying a pairing of a display to a mobile device; displaying one or more wagering odds in one or more first locations on the display during the live action sporting event in response to a first input on the mobile device; and displaying the one or more wagering odds in one or more second locations on the display during the live action sporting event in response to a second input on the mobile device.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates an interactive display for in-play wagering, according to an embodiment.

FIG. 2 illustrates a base module, according to an embodiment.

FIG. 3 illustrates a pairing module, according to an embodiment.

FIG. 4 illustrates a display module, according to an embodiment.

FIG. 5 illustrates a wagering module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick-em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an interactive display for in-play wagering. This system comprises of a live event 102, for example, a sporting event such as a football game, a basketball game, a hockey game, a tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round-robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such an injury to an important player such as a listed pitcher, in which a sportsbook, casino or racino will take an available wager off the board. As the line moves there becomes an opportunity for a bettor to bet on both sides at different point spreads to middle and win both bets. Sportsbooks will often offer bets on portions of games, such as first half bets and half-time bets. Additionally, the sportsbook can offer futures bets on live events 102 in the future. Sportsbooks need to offer payment processing services to cash out customers. This can be done at kiosks at the live event 102 or another location. For example, considering a live event 102 being a baseball game that is played between the New York Yankees and the Los Angeles Dodgers, at Yankee Stadium, New York City.

Further, embodiments may include a plurality of sensors 104 that may be used such as motion sensors, temperature sensors, humidity sensors, cameras such as an RGB-D camera which is a digital camera capturing color (RGB) and depth information for every pixel in an image, microphones, radiofrequency receiver, a thermal imager, a radar device, a LIDAR device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that collects statistical information through real-time X, Y positioning of players and X, Y, Z positioning of the ball. In the example of baseball game, the plurality of sensors 104 may be used for capturing parameters such as spin rate of the ball, speed of the ball, ball positions, launch angle, and exit velocity.

Further, embodiments may include a cloud 106 or communication network may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable resources and higher-level services that can be rapidly provisioned with minimal management effort, often over internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to Wagering Network 108 which may perform real time analysis on the type of play and the result of the play. The cloud 106 may also be synchronized with game situational data, such as the time of the game, the score, location on the field, weather conditions, and the like which may affect the choice of play utilized. For example, in other embodiments, the cloud 106 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein.

Further, embodiments may include a wagering network 108 which may perform real-time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other embodiments, wagering network 108 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein. The wagering network 108 can offer a number of software as a service managed services such as, user interface service, risk management service, compliance, pricing and trading service, IT support of the technology platform, business applications, game configuration, state-based integration, fantasy sports connection, integration to allow the joining of social media, as well as marketing support services that can create engaging promotions to the user.

Further, embodiments may utilize a user database 110 which contains data relevant to all users of the wagering network 108, which may include, a user ID, a device identifier, a paired device identifier, wagering history, and wallet information for the user. The user database 110 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 110 may contain betting lines and search queries. The user database 110 may be searched based on a search criteria received from the user. Each betting line may include a plurality of betting attributes such as at least one of live event 102, a team, a player, an amount of wager, etc. The user database 110 may include information related to all the users involved in the live event 102. In one example embodiment, the user database 110 may include information for generating a user authenticity report and a wagering verification report. Further, the user database 110 may be used to store user statistics like, but not limiting to, retention period for a particular user, frequency of wagers placed by a particular user, average amount of wager placed by each user, etc.

Further, embodiments may include an odds calculation module 112 which utilizes information from historical plays database 114 and the information from the sensor feeds 104 to calculate odds for in-play wagers. The information from the historical plays database 114 may include data related to the type of the play, the previous information related to players involved in the live event 102, and results of the previous live events 102. The odds for each live event 102, such as in a baseball game, a particular player hitting a home run, a single, or a strikeout, may be calculated based on the information received from the sensor feeds 104 and the previous information related to the particular player. Further, the odds may be updated based on in-game events (for example, a player strikes a home run with the same pitcher, decreasing his odds of getting a strikeout from the same pitcher). The odds may be calculated or adjusted based on statistical information related to the live event 102 and the statistical information of the players. For example, the odds may be determined based on the historical data such as prior performance information about a player (like batting average against a certain pitcher, earned run average, catch probability, hamstring strain), and physiological information of player(s) etc., and current i.e. real-time information, such as current confidence level etc. In one embodiment, the type of wagering may depend on the type of game being played. In one embodiment, the odds calculation module 112 may determine the available wagers to the user. The odds calculation module 112 may also utilize a probability engine, which assembles all the historical data and real-time data and produces the odds (stored in the odds database 116) for in-play wagers. Thus, the odds calculation module 112 information relevant to all the potential outcomes, as available wagers, which facilitates the user with a better knowledge to make certain judgements about the potential performance of players in each live event 102 and place a calculated wager with a potential return on the wager. For example, in baseball game, the odds calculation module 112 may calculate odds related to the possible outcomes of an at-bat for Aaron Judge of New York Yankees hitting against the Clayton Kershaw of LA Dodgers, hitting a single are 4/1 (in moneyline+400), hitting a double are 5/1, hitting a home run are 3/1, and a strikeout are 2/1.

Further, embodiments may utilize a historical plays database 114 that contains play data for the type of sport being played in the live event 102. In one embodiment, for optimal odds calculation, the historical play data should include metadata about the historical plays, such as time of the live event 102, location, weather, previous plays, opponent, physiological data of the players (including blood pressure, pulse rate, and respiration rate), batting average of all players, information related to the players such as injuries in the past, batting average, earned run average, catch probability, spin rate, launch angle, exit velocity, information related to trainers of each player, etc. For example, in the baseball game, information stored in the historical plays database 114 may include information related to the previous baseball games played by the New York Yankees such as, but not limited to, the weather condition, i.e. during the match, it was cloudy.

Further, embodiments may utilize an odds database 116 that contains the odds calculated by the odds calculation module 112. The odds database 116 stores all the odds and may be used by a mobile device base module 126 to display the odds on the display device 122, and to take bets from the user through the mobile device wagering module 132. In one embodiment, the type of wagering may depend on the type of game being played.

Further, embodiments may include a broadcast network 118 that is the rights holder delivering the live event 102 to the set-top box 120 based upon the user's media subscription. The broadcast network 118 may broadcast or simulcast in real-time throughout the real world using existing and conventional video transport media, such as web, TV, satellite, telephone network, and cable. The live event 102 may be broadcasted in real-time, via the broadcast network 118, with live computer-generated commentary (e.g., in a plurality of languages) that involves moment-by-moment commentary of the action. The broadcast network 118 may collect information from the sensor feed 104 (for example, the video feed and the audio feed, related to the live event 102). The live event 102 may be simulcast, allowing the users to watch and wager on the live event 102. The broadcast network 118 may also display data about the live event 102 and produce hardcopy materials for posters and magazines. The broadcast network 118 may also televise the live event 102 with self-contained video rendering, playback, and caption generator, for the ease of access of the user. The broadcast network 118 may also include an integrated event which allows the user to switch to an alternate video stream.

Further, embodiments may include a set-top box 120 which receives media content from the broadcast network 118, that is displayed on the display device 122. The set-top box 120 may be connected to the display device 122 via the HDMI connection. Other connections may include a power cable coupling the set-top box 120 to an external cable source, and a category five (Cat 5) cable coupling the set-top box 120 to an external pay-per-view source. The set-top box 120 may include a dongle capable particular technology and functionality extensions thereto. The set-top box 120 may act as an intermediate between a mobile device 124 and the display device 122. Further, the positioning of the set-top box 120 may vary depending on environment and application and, with certain functionality, the set-top box 120 may be placed more discreetly behind the display device 122. Moreover, it should be appreciated that the set-top box 120 and the display device 122 may be at least partially or fully integrated, in element 120.

Further, embodiments may include a display device 122. The display device 122 may be any electronic visual display device, for example, and connected to the set-top box 120 via a high-definition multimedia interface (HDMI) connection. The display device 122 may include an array of buttons for adjusting various settings such as display device channel and volume and allowing for various inputs during the installation, maintenance, or repair of the set-top box 120 and the display device 122. Further, the display device 122 may be configured to generate a code (for example, a machine-readable optical label or a Quick Response, QR, code) to couple the mobile device 124 to the display device 122. In one embodiment, the display device 122 may offer connectivity through a consumer infrared (IR), Bluetooth or other wireless-protocol-based means to control the display device 122 via the set-top box 120 or the mobile device 124, for example. The display device 122 may display the live event 102 to include in-play wagering odds available to the user from the wagering network 108. The display device 122 may display the information related to the current wager from the historical plays database 114. For example, the display device 122 may display in-play wagering odds related to a particular player and information related to previous matches of the particular player. Further, the display device 122 may display odds related to the live event 102 i.e. a game, in the form of a ribbon may be displayed below/on one side of the game on a screen of the display device 122, depending on the type of sport. The display device 122 may display the ribbon of potential wagers on the display device screen and control the wager selections through the mobile device 124. In one embodiment, the content displayed on the display device 122 may be customized by the user (for example, size of the in-play waging odds on the display device screen). In one embodiment, the odds related to the live event 102 may be overlaid on a particular player or on the field. In one embodiment, in the baseball game, the odds related to the live event 102, may be displayed as a graphic on the field, odds of a hitter may be overlaid on the hitter, odds of a pitcher may be displayed on an edge of the screen of the display device 122. In an embodiment, the display device 122 may be a television or projection screen, for example.

Further, embodiments may include a mobile device 124 that can pair with the set-top box 120 to allow the user to both adjust the display of the live event 102 on the display device 122 to include in-play wagering odds available to the user from the wagering network 108 in various visual representations, as well as allow the user to place the wagers related to live event 102. The mobile device 124 may include input modules like a keypad, touchscreen, microphones, cameras, proximity sensors and other sensors for receiving input from the user. The mobile device 124 may also include output modules like speakers, display screen, and infrared transmitter, for communication with the user and with the display device 122. The mobile device 124 may be connected to the display device 122 via infrared (IR), Bluetooth or other wireless-protocol-based means. In one embodiment, while watching the live event 102, the user of the mobile device 124 may use an application and scan a code or enter a code unique to the display device 122. Further, the mobile phone 124 will then control the connection between the user and the display device 122. The mobile device 124 may scan a code displayed on the display device 122 for pairing with the display device 122. The mobile device 124 may also support augmented reality (AR) technology, enabling the user to interact with the display device 122, via AR. The mobile device 124 may also be able to detect air gestures as indicated by the user, for controlling actions on the display device 122 like a particular gesture for placing a wager etc. For example, in the baseball game, the user may select the option of displaying the odds or wagers, in the form of a ribbon, on the bottom area of the screen of the display device 122.

Further, embodiments may include a base module 126 that allows the user to pair their mobile device 124 with the set-top box 120 and the wagering network 108 to allow the user to both place wagers and manipulate the display of the live sporting event to integrate available in-play wagers on the display device 122. Further, the base module 126 may allow the user to log-in/sign-in the wagering app, i.e. wagering app, during the live event 102. Further, the base module 126 may determine whether the mobile device 124 is paired with the set-top box 120. In one case, if the mobile device 124 is not paired with the set-top box 120, then the base module 126 may trigger the pairing module 128, to pair the mobile device 124 with the set-top box 120. Further, upon successful pairing, the base module 126 may trigger a display module 130, to allow the users with options to manipulate how the available wagers and odds on different in-play events are displayed or to place a wager related to the live event 102. Further, when the user selects to place a wager, then the base module 126 may trigger a wagering module 132, which enables the user to select from available wagers from the wagering network 108. Further, when the user selects to adjust the display, then the base module 126 may trigger the display module 130 to manipulate how the available wagers and odds on different in-play events are displayed. Further, the base module 126 may constantly monitor the live event 102 to conclude on the wagers placed by the user or to continue facilitating the user with options to adjust the display of the display device 122 or to place a wager related to the live event 102. Thereafter, the base module 126 may constantly monitor if the user logs-off from the app, during the live event 102.

Further, embodiments may include a pairing module 128 which allows the user to connect their mobile device 124 with the set-top box 120 to allow the user to control the output of the set-top box 120 to the display device 122 with their mobile device 124. In a scenario, after signing in, the base module 126 may trigger the pairing module 128 to offer a user to pair with the set-top box 120. First, the mobile device 124 may search for identifying the set-top box 120, based on one or more parameters such as, but are not limited to, proximity to the mobile device 124. Second, the mobile device 124 may prompt the identified set-top box 120 for pairing with the mobile device 124. Third, the set-top box 120 may initiate the pairing process by displaying a code on the display device 122. In one embodiment, the display device 122 may display a QR code or another code, for pairing with the mobile device 124. After the code is displayed on the display device 122, the user may enter the code manually or scan a QR code (displayed on the display device 122) via the mobile device 124. Thus, upon entering the correct code, the pairing module 128 may be configured to pair the mobile device 124 with the set-top box 120. In one embodiment, during the pairing process, the display device 122 displays a code "7777", then the user is required to enter the code "7777" on the mobile device 124, for successful pairing of the mobile device 124 with the set-top box 120. In one embodiment, the display device 122 may display a QR code and the user may scan the QR code with their mobile device 124, which may complete the pairing process. Successively, the pairing module 128, upon successful pairing of the mobile device 124, allows the user to control the output of the set-top box 120. In another case, if the pairing is unsuccessful, then the pairing module 128 may send the information regarding the unsuccessful pairing, to the base module 126.

Further, embodiments may include a display module 130 which allows the user to manipulate how the available wagers and odds on different in-play events are displayed. Once the mobile device 124 is paired to the set-top box 120, the base module 126 may trigger the display module 130 to offer multiple options for displaying the odds. The display module 130 may offer the user to select from multiple options for displaying the odds available in the in-play live event 102. The options available for displaying the odds may be, but are not limited to, displaying the odds in a ribbon formation, for example on the bottom section of the display device 122, on the top section of the display device 122, on either sides of the display device 122, or as an overlay on a particular player. Further, the display module 130 may facilitate the user to manipulate the contents displayed on the display device 122 (for example, size of the in-play waging odds on the display device screen). In one embodiment, the odds related to the live event 102 may be overlaid on a particular player. For example, in the baseball game, the display module 130 may enable the user to control the viewing of odds related to the live event 102, i.e. the odds may be displayed as a graphic on the field, odds of the hitter hitting a single, may be overlaid on the hitter; odds of the pitcher getting a strikeout, may be displayed on an edge of the screen of the display device 122. Further, the display module 130 may receive an input from the user related to how the wagers or odds be displayed on the display device 122. In one embodiment, the user may select the option of displaying the wagers or odds, in the form of a ribbon, on the bottom area of the screen of the display device 122 like displaying the odds. Based on the user's input, the display device 122 may reflect a corresponding change in the way how the wagers or odds are being displayed on the display device 122. In one embodiment, the display device 122 displays the wagers or odds in the form of a ribbon, on the bottom area of the screen of the display device 122. After reflecting the change on the display device 122, it returns back to the base module 126. Based on the options offered to the user, the user may select a particular option. The wagering module 132 may collect the wager and transmit the wager to the wagering network 108. For example, if the user has an opening balance of $2000 and places a wager of $100 on Aaron Judge of New York Yankees, hitting a single against the Clayton Kershaw of LA dodgers at +400 odds. Further, when play in the live event 102 is concluded, then the results of the live event 102 are received. In one embodiment, the result of the live event 102 is Aaron Judge of New York Yankees, playing in the 3rd inning against the Clayton Kershaw of LA dodgers, hits a single. The result of the play may be used to update the information in the historical plays database 114. In one embodiment, the result of the wager may be displayed via the display device 122, to the user.

Further, embodiments may include a wagering module 132 that may compare the result of the play with the wagers placed by the user, to determine a result of the wager i.e. whether the user has won or loss. Based on the comparison of the result of the live event 102 and the wagers placed by the user, the result of the wager may be used to calculate the balance for the user. Based on the comparison of the result of the play, with the wagers placed by the user, the wagering module 132 may deliver the information related to the result of the wager to the user database 110. Further, the information related to the result of the wager may be used to update the balance amount of the user, based on the wager earned/lost. For example, if Aaron Judge hits a single, then the user would make a profit of $400, as per the initial wager ($100) placed at +400 odds. Thus, the updated balance of the user (with an opening balance of $2000), after the completion of the live event 102, will be $2000+$400=$2400. Further, the updated balance of $2400 of the user may be prompted to update the information related to the user, in the user database 110. Further, the wagering module 132 monitors the live event 102, until a predefined condition is met. In one embodiment, the predefined condition may be that the user has logged out of the live event 120 or the live event 102 has ended. In addition, at the end of the live event 102, the user may be prompted with a message reminder for a next live event, as a recommendation.

FIG. 2 illustrates the base module 126. The process begins as the base module 126 is triggered when the user logs-in, at step 200, to the wagering network 108 through an app on the mobile device 124, i.e. a wagering app. The base module 126 may facilitate the user to pair their mobile device 124 with the set-top box 120 and the wagering network 108, thus allowing the user to both place wagers and manipulate the display of the live event 102 to integrate available in-play wagers on the display device 122. After logging in to the wagering app, the base module 126 determines, at step 202 whether the mobile device 124 is paired with the set-top box 120. In one case, if the mobile device 124 is paired with the set-top box 120, then the base module 126 may facilitate the user with options to adjust the display of the display device 122 or to place a wager related to the live event 102. In another case, if the mobile device 124 is not paired with the set-top box 120, then the base module 126 may trigger the pairing module 128, at step 202. The pairing module 128 may be triggered, at step 204, to allow the user to pair the mobile device 124 with the set-top box 120 to allow the user to control the output of the set-top box 120 with their mobile device 124. In one embodiment, the pairing process may be done by entering a code unique to the display device 122, on the mobile device 124. Upon pairing of the mobile device 124 with the set-top box 120, the base module 126 may facilitate the user with options to adjust the display of the display device 122 or to place a wager related to the live event 102, at step 206. In one case, if the user selects to place the wager, then the base module 126 may trigger, at step 208 the wagering module 132. The wagering module 132 may allow the user to select from available wagers offered by the wagering network 108. In another case, if the user selects the display adjustment, then the base module 126 may trigger, at step 210 the display module 130 to manipulate how the available wagers and odds on different in-play events are displayed. The base module 126 may constantly monitor, at step 212, the live event 102, for completion. In one case, when the live event 102 is concluded, the base module 126 may again trigger the wagering module 132, to conclude on the wagers placed by the user. In another case, when the live event 102 is not concluded, then the base module 126 may continue facilitating the user with options to adjust the display of the display device 122 or to place a wager related to the live event 102. The base module 126 may also constantly monitor, at step 214 if the user logs-off from the app, during the live event 102. In one case, when the user logs-off from the app, then the base module 126 may again trigger the wagering module 132, to conclude on the wagers placed by the user. In another case, when the user does not logs-off from the app, then the base module 126 may continue facilitating the user with options to adjust the display of the display device 122 or to place a wager related to the live event 102. Thereafter, the program ends, at step 216.

FIG. 3 illustrates the pairing module 128. The process begins with the pairing module 128 may receive a prompt, at step 300 from the base module 126, for pairing the mobile device 124 with the set-top box 120. The mobile device 124 may search, at step 302, for a set-top box 120, based on one or more parameters such as, but are not limited to, proximity to the mobile device 124. The mobile device 124 may prompt the identified set-top box 120 for pairing with the mobile device 124, and thus initiating a pairing process between the mobile device 124 and the set-top box 120. The set-top box 120 may initiate the pairing process by displaying, at step 306 a code on the display device 122. In one embodiment, the display device 122 may display a QR code or an alphanumeric code, for pairing with the mobile device 124. After the code is displayed on the display device 122, the user may, at step 308 enter the code manually or scan a QR code (displayed on the display device 122) via the mobile device 124. Thus, upon entering the correct code, the pairing module 128 may be configured to pair the mobile device 124 with the set-top box 120. In one embodiment, during the pairing process, the display device 122 displays a code "7777", then the user is required to enter the code "7777" on the mobile device 124, for successful pairing of the mobile device 124 with the set-top box 120. The pairing module 128 may then determine, at step 310, whether the pairing is successful. In one case, if the pairing is successful, then the pairing module 128 may allow the user to control the output of the set-top box 120. In another case, if the pairing is unsuccessful the process can return to step 304 to attempt the pairing process again. If the user does not want to attempt the pairing again, then the process returns to the base module 126. Once pairing process is complete the process returns, at step 312, to the base module 126.

FIG. 4 illustrates the display module 130. The process begins with the display module 130 receiving, at step 400, a prompt from the base module 126. It can be noted that the display module 130 is triggered when the user wants to manipulate how the available wagers and odds on different in-play events will be displayed. After receiving the prompt from the base module 126, the display module 130 may display, at step 402, a list of options on how the wagers or odds may be displayed on the display device 122. In one embodiment, the odds related to the live event 102, may be overlaid on a particular player or on the field. Further, the display module 130 may display options for displaying odds related to the live event 102, i.e. a game, in the form of a ribbon displayed either on the bottom area/on one side of the game, or on a screen of the display device 122, depending on the type of the sport. In one exemplary embodiment, in the baseball game, the display module 130 may enable the user to control the viewing of odds related to the live event 102, i.e. the odds may be displayed as a graphic on the field, odds for a variety of outcomes for the hitter (i.e. +400 single), may be overlaid on the hitter; odds for a variety of outcomes for the pitcher (i.e. +300 for a strikeout) may be displayed on an edge of the screen of the display device 122. In another embodiment, the available wagers could be overlaid on parts of the field or game play area correlated to available wagers, such as home run odds being overlaid on the outfield fence or the stands beyond it. The display module 130 may receive, at step 404, an input from the user related to how the wagers or odds be displayed on the display device 122. In one embodiment, the user may select the option of displaying the wagers or odds, in the form of a ribbon, on the bottom area of the screen of the display device 122. Based on the user's input, the display of the live event 102 is integrated with the available wagers on the display device 122 to be displayed, at step 406, as the user indicated in step 404. In one embodiment, the display device 122 displays the wagers or odds in the form of a ribbon, on the bottom area of the screen of the display device 122. After reflecting the change on the display device 122, it returns, at step 408 to the base module 126.

FIG. 5 illustrates the wagering module 132. The process begins with the wagering module 132 may receive a prompt, at step 500, from the base module 126. It can be noted that the wagering module 132 may be triggered when the user wants to place a wager in the live event 102. After receiving the prompt from the base module 126, the wagering module 132 may offer, at step 502 multiple wagers available to the user to place a wager related to the live event 102. For example, the wagering module 132 may offer options including a wager of +400 on Aaron Judge of New York Yankees hitting a single in his at bat in the third inning against the Clayton Kershaw of LA dodger, or a wager of +650 him hitting a homerun. The wagering module 132 may receive, at step 504 a wager selection from the user. For example, placing a wager of $100 at +400 odds on Aaron Judge hitting a single off of Clayton Kershaw. The wagering module 132 will then determine, at step 506, the result of the wagered upon play in the live event 102. This may be in the form of a prompt from the wagering network 108 that the play is concluded along with the results, or from the live event 102 broadcasters, a 3rd party statistics service, or as is in this example, the sensors 104 are monitored for the completion of and results of the play. Further, the wagering module 132 may compare, at step 508, the result of the live event 102 with the wagers placed by the user, to determine a result, i.e. whether the user has won or loss. In this example, the wager of $100 placed for Aaron Judge hitting a single of Clayton Kershaw and the result of the live event 102, i.e. Aaron Judge hitting a single, are compared to determine the result of the wager. Based on the comparison of the result of the live event 102 and the wager placed by the user, the balance amount may be calculated, at step 510, for the user. For example, the user wins the wager of $100 at +400 odds that Aaron Judge will hit a single on the next play and the result of the live event 102 is Aaron Judge hitting a single. Thus, the updated balance of the user (with an opening balance of $2000), after the completion of the live event 102, will be $2000+$400=$2400. The wagering module 132 will update, at step 512 the account balance of the user who place the wager in the user database 110. In this example, after winning the wager of $100 placed at +400 odds, the updated balance of the user is $2400. Once the user database 110 is updated with the result of the wager, the process returns, at step 514 to the base module 126.

The foregoing description and accompanying figures illustrate the principles, preferred embodiments and modes of operation of those embodiments. However, the embodiments should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system integrating sports wagering into the display of a live sporting event, comprising:
   a first device having a first display;
   a second device having a second display;
   a broadcast of a live sporting event; and
   a wagering network,
   wherein the wagering network provides one or more wagers on one or more outcomes of actions inside of the live sporting event,
   the first device controls an integrated display of data associated with the one or more wagers and the broadcast of the live sporting event on the second display,
   the data associated with the one or more wagers is displayed on the second display, and
   the data associated with the one or more wagers is related to one or more elements of the live sporting event, and is overlaid on one or more corresponding elements in the live sporting event, or the data associated with the one or more wagers is displayed at a location on a game play area that is correlated to one or more locations relevant to the one or more wagers.

2. The system of claim 1, wherein the first device is communicatively paired to the second device.

3. The system of claim 2, further comprising a display module to display the data associated with the one or more wagers upon a successful pairing of the first device to the second device.

4. The system of claim 1, wherein the data associated with the one or more wagers is displayed in a ribbon on the second device.

5. The system of claim 1, wherein a display module is triggered as a result of an input on the first device.

6. The system of claim 1, wherein inputs on the first device control one or more of the display of the data associated with the one or more wagers on the second device and locations of display of the data associated with the one or more wagers.

7. The system of claim 1, further comprising a wagering module configured to provide wagering activity on the live sporting event in real time.

8. The system of claim 7, wherein the wagering module is coupled to the wagering network and facilitates placing wagers on the mobile device.

9. The system of claim 1, wherein the first device is communicatively paired to a set top box.

10. A method for displaying wagering information during a live action sporting event, comprising:
    displaying a pairing of a first device having a display with a first display to a second device with a second display;
    displaying wagering information on the first device;
    displaying, on the first device, one or more options related to a type and location of one or more wagers on the second device; and
    displaying, on the first device, selections of the one or more wagers on the second device based on a selection of the one or more options related to the type and location of the one or more wagers, and overlaying, on the second device, data related to the one or more wagers that relate to one or more elements of the live sporting event on one or more corresponding elements in the live sporting event, or overlaying, on the second device, data related to the one or more wagers on one or more locations of a game play area that are correlated to one or more locations relevant to the one or more wagers.

11. The method of claim 10, further comprising wagering on the live action sporting event through a wagering module on the first device.

* * * * *